United States Patent
Hiwada

(10) Patent No.: US 7,239,741 B2
(45) Date of Patent: Jul. 3, 2007

(54) IMAGE PROCESSING DEVICE EXECUTING IMAGE PROCESSING ON INPUT IMAGE AND PROCESSING METHOD FOR THE SAME

(75) Inventor: Kazuhiro Hiwada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 628 days.

(21) Appl. No.: 10/390,778

(22) Filed: Mar. 19, 2003

(65) Prior Publication Data

US 2004/0131247 A1    Jul. 8, 2004

(30) Foreign Application Priority Data

Jan. 7, 2003    (JP) ............... 2003-001489

(51) Int. Cl.
*G06K 9/00*    (2006.01)

(52) U.S. Cl. ............... 382/154; 382/190; 382/285; 345/420

(58) Field of Classification Search ............... 382/154, 382/233, 285, 302, 243, 103, 190; 345/420, 345/419; 399/119, 262; 250/363.04; 430/120
See application file for complete search history.

(56) References Cited

U.S. PATENT DOCUMENTS

| | | | |
|---|---|---|---|
| 5,247,590 A * | 9/1993 | Fukuhara et al. ............ 382/243 |
| 5,652,851 A * | 7/1997 | Stone et al. ................ 715/804 |
| 6,272,231 B1 | 8/2001 | Maurer et al. | |
| 6,301,370 B1 | 10/2001 | Steffens et al. | |
| 6,466,205 B2 * | 10/2002 | Simpson et al. ............ 345/419 |
| 6,771,277 B2 * | 8/2004 | Ohba ........................ 345/629 |
| 6,919,892 B1 * | 7/2005 | Cheiky et al. .............. 345/473 |
| 6,944,327 B1 * | 9/2005 | Soatto ....................... 382/154 |
| 7,020,305 B2 * | 3/2006 | Liu et al. .................... 382/107 |

FOREIGN PATENT DOCUMENTS

JP    2000-322588    11/2000

* cited by examiner

*Primary Examiner*—Sheela Chawan
(74) *Attorney, Agent, or Firm*—Oblon, Spivak, McClelland, Maier & Neustadt, P.C.

(57) ABSTRACT

An image processing device is composed of an image drawing section, an image input section, a corresponding-point searching section, and a processing parameter improving section. The image drawing section has a preset three-dimensional model image to draw a three-dimensional image on the basis of the three-dimensional model image and a first processing parameter. An input image of a still image or a motion picture is input to the image input section. The corresponding-point searching section searches for that point on the input image input to the image input section which corresponds to a certain point on the three-dimensional image drawn by the image drawing section, to obtain corresponding-point position information. The processing parameter improving section uses the corresponding-point position information obtained by the corresponding-point searching section to improve a value for the first processing parameter to determine a second processing parameter.

36 Claims, 5 Drawing Sheets

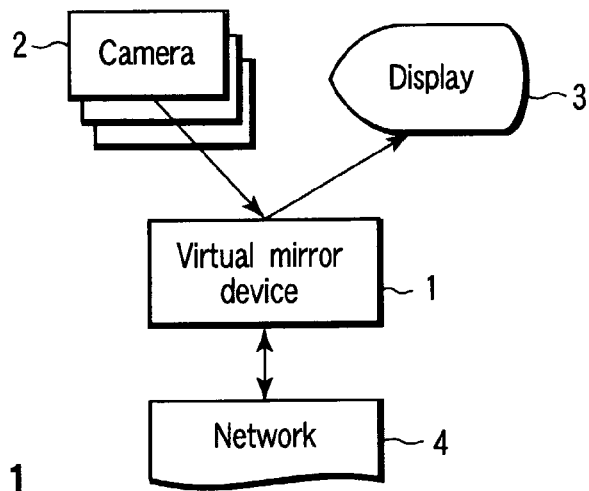
FIG. 1
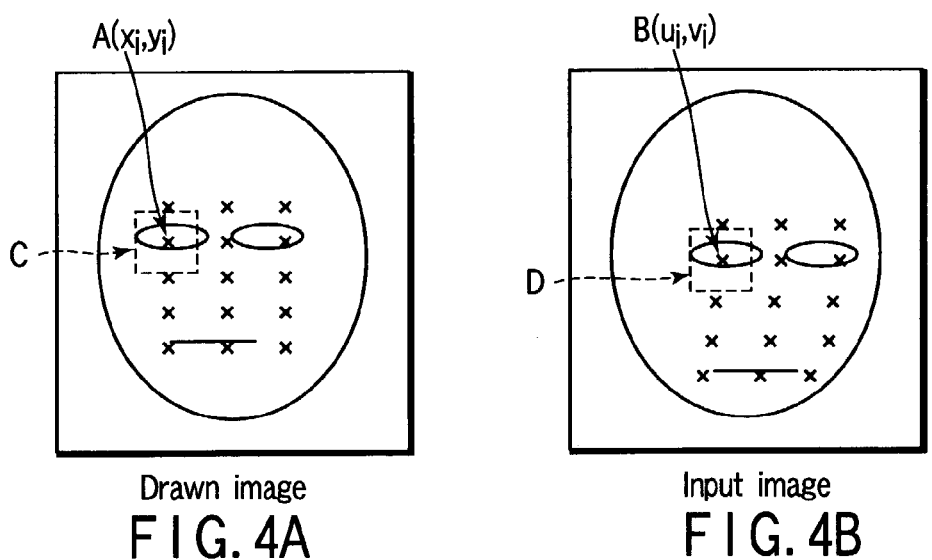
Drawn image
FIG. 4A
Input image
FIG. 4B
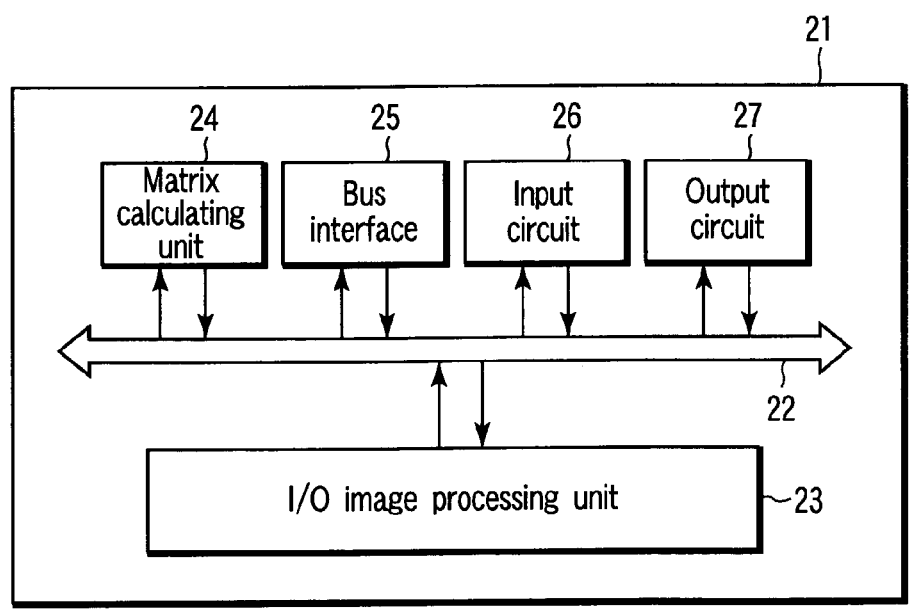
FIG. 5

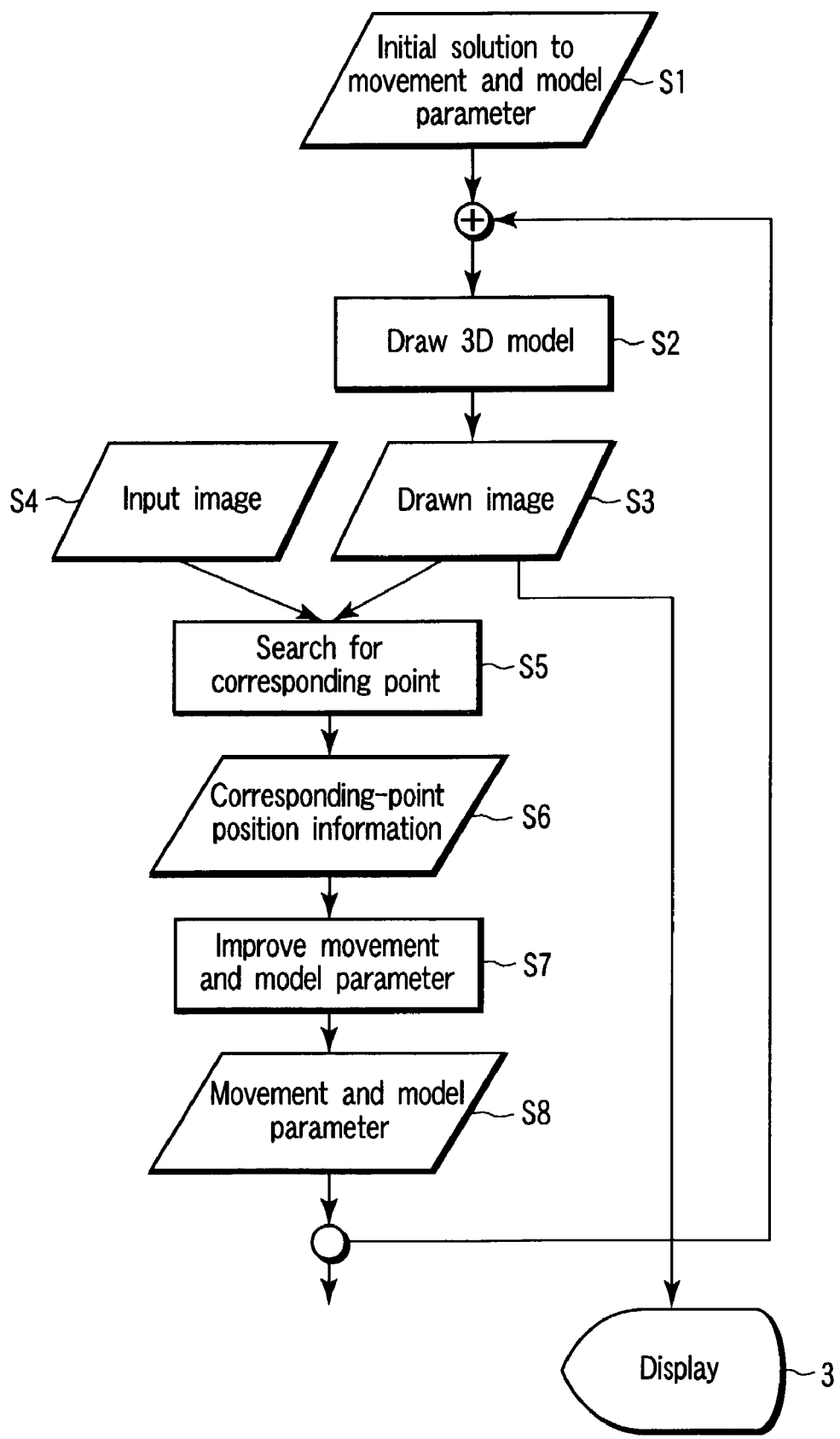
F I G. 3

IMAGE PROCESSING DEVICE EXECUTING IMAGE PROCESSING ON INPUT IMAGE AND PROCESSING METHOD FOR THE SAME

CROSS-REFERENCE TO RELATED APPLICATIONS

This application is based upon and claims the benefit of priority from the prior Japanese Patent Application No. 2003-001489, filed Jan. 7, 2003, the entire contents of which are incorporated herein by reference.

BACKGROUND OF THE INVENTION

1. Field of the Invention

The present invention relates to an image processing device that executes image processing such as decorating or manipulating an input image and then outputs the processed image to a display, and in particular, to an image processing device that decorates an image of a person's face by for example, changing the person's hairstyle or making up the person and then displays the decorated image on a display or transmits the image through a network.

2. Description of the Related Art

Image processing devices have hitherto been used which execute image processing such as decoration or manipulation of an input image of a person and then output the processed image to a display or the like. Devices and software are now commonly used which, for example, change the hairstyle of a person in a portrait, have him or her wear a pair of glasses, or make him or her up, and then simulate this situation on a still image.

For example, some of the image processing devices that have been proposed and used for the above purpose display a decorated image by extracting characteristic points from a face image and then superimpose a predetermined image on these points (for example, Jpn. Pat. Appln. KOKAI Publication No. 2000-322588).

However, images obtained by these image processing devices are not satisfactory as a simulation of actual images. That is, these devices cannot precisely detect those characteristic points or areas in a face image on which generation of a virtual image is based. They thus fail to sufficiently deal with changes in a person's expression, movements of the face, and the like. Consequently, it is difficult for these devices to apply decoration, manipulation, and the like to an input image and then output the processed image in real time.

BRIEF SUMMARY OF THE INVENTION

According to an aspect of the present invention, there is provided an image processing device comprising an image drawing section which has a preset three-dimensional model image to draw a three-dimensional image on the basis of the three-dimensional model image and a first processing parameter; an image input section to which an input image of a still image or a motion picture is input; a corresponding-point searching section which searches for that point on the input image input to the image input section which corresponds to a certain point on the three-dimensional image drawn by the image drawing section, to obtain corresponding-point position information; and a processing parameter improving section which uses the corresponding-point position information obtained by the corresponding-point searching section to improve a value for the first processing parameter to determine a second processing parameter.

Further, according to an aspect of the present invention, there is provided an image processing method comprising drawing a three-dimensional image on the basis of a three-dimensional model image and a first processing parameter; receiving either an input still image or motion picture; searching for a point on the input image which corresponds to a certain point on the three-dimensional image to obtain corresponding-point position information; and using the corresponding-point position information obtained to improve a value for the first processing parameter to determine a second processing parameter.

BRIEF DESCRIPTION OF THE SEVERAL VIEWS OF THE DRAWING

FIG. 1 is a diagram showing a configuration of a virtual mirror device and its peripheral portions according to a first embodiment of the present invention;

FIG. 3 is a diagram showing the flow of operations performed by the virtual mirror device according to the first embodiment;

FIGS. 4A and 4B are diagrams showing how a corresponding-point searching section of the virtual mirror device according to the first embodiment obtains corresponding-point position information;

FIG. 5 is a layout showing an example in which the virtual mirror device according to the first embodiment is formed on a single semiconductor substrate;

DETAILED DESCRIPTION OF THE INVENTION

Figure 2:
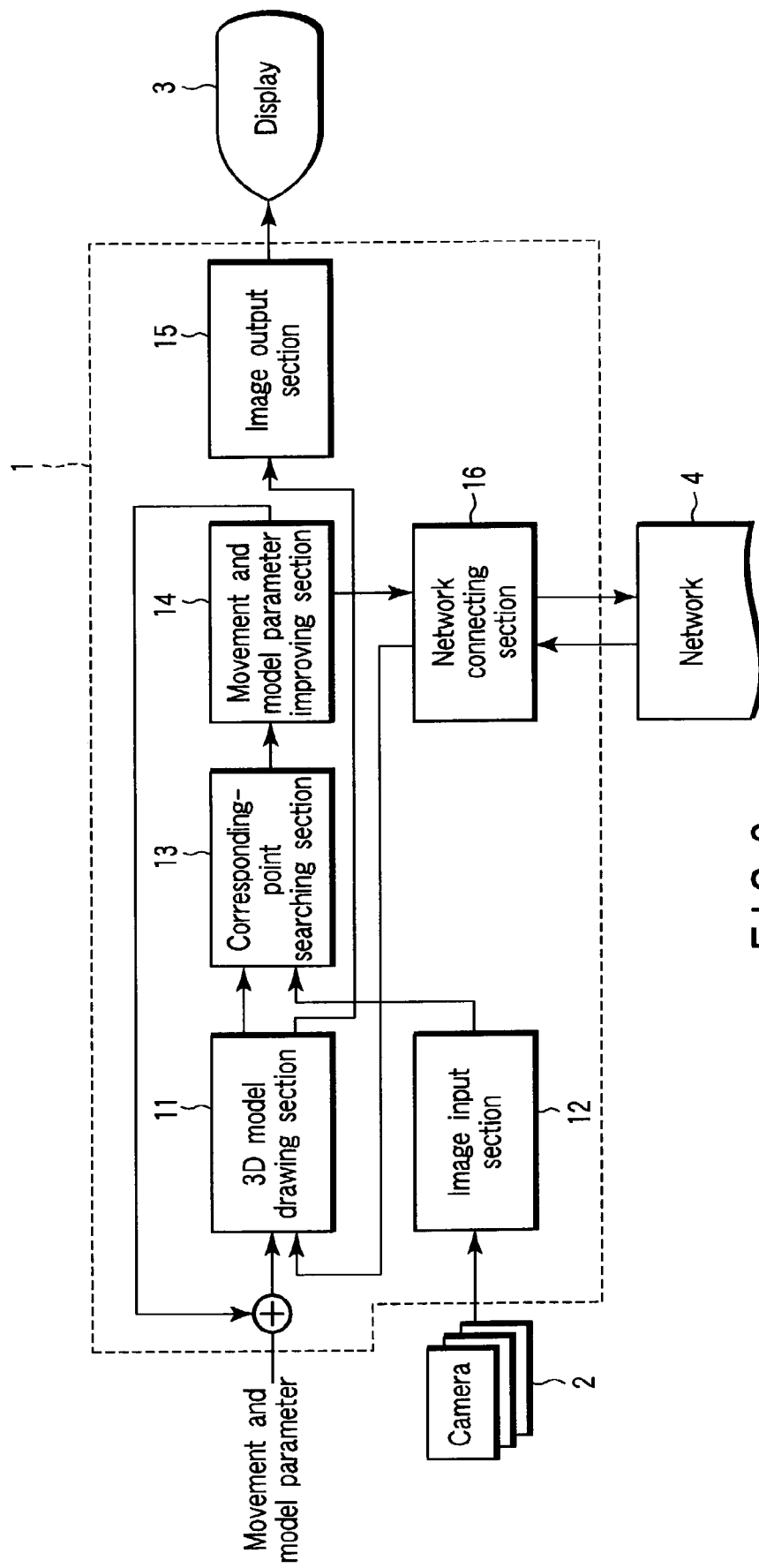
FIG. 2 is a block diagram showing a configuration of the virtual mirror device according to the first embodiment.

With reference to the drawings, description will be given of virtual mirror devices as image processing devices according to embodiments of the present invention, as well as an image processing method. In the description, common parts are denoted by common reference numerals throughout the drawings.

First Embodiment

First, description will be given of a virtual mirror device according to a first embodiment of the present invention.

FIG. 1 is a diagram showing a configuration of a virtual mirror device and its peripheral portions according to the first embodiment of the present invention.

A virtual mirror device 1 executes image processing such as decoration or manipulation of an image input by an image pickup device such as a camera 2, e.g. an image of a person's face, and then outputs the processed image. Alternatively, it executes image processing such as decoration or manipulation of an image input by the camera 2, and then transmits the processed image to a network 4. Furthermore, the virtual mirror device 1 receives encoded information from the network 4, decodes and decorates the information, and then outputs the image obtained to a display.

The camera 2 may comprise a plurality of cameras in order to obtain precise images. Furthermore, the virtual mirror device 1 comprises a processing capability sufficient to process images obtained from the plurality of cameras 2.

The decorations or manipulation refer to, for example, addition of makeup to a face image or import of an expression. If makeup is added to a face image, an image input by the camera 2 is subjected to makeup such as a virtual change of lipstick color. Then, the processed image is displayed on a display 3. On the other hand, to import an expression, an expression over a face input by the camera 2 is imported to another person's or animal's face. Then, the processed image is displayed on the display 3. Then, it is possible that when a user smiles in front of the camera 2, the animal on the display 3 similarly smiles.

The device can also be used like a videophone by performing similar operations over the network 4. When the apparatus is used as a videophone, an animal's expression instead of a user's expression can be displayed by, for example, importing the person's expression to the animal's expression. Thus, highly anonymous speech making speakers feel as if they were close to each other can be achieved wherein each speaker does not actually know with whom he or she is talking but can understand changes in the other speaker's expression or movements of the other speaker's face.

Now, a configuration of the virtual mirror device 1 will be described.

FIG. 2 is a block diagram showing a configuration of the virtual mirror device according to the first embodiment.

The virtual mirror device is composed of a 3D model drawing section 11, an image input section 12, a corresponding-point searching section 13, a movement and model parameter improving section 14, an image output section 15, and a network connecting section 16 as shown in FIG. 2.

An output section of the 3D model drawing section 11 is connected to a first input section of the corresponding-point searching section 13. An output section of the image input section 12 is connected to a second input section of the corresponding-point searching section 13. The externally provided camera 2 is connected to an input section of the image input section 12.

An output section of the corresponding-point searching section 13 is connected to an input section of the movement and model parameter improving section 14. An output section of the movement and model parameter improving section 14 is connected to an input section of the 3D model drawing section 11. Furthermore, an output section of the 3D model drawing section 11 is connected to an input section of the image output section 15. An output section of the image output section 15 is connected to the display 3.

Further, the externally provided network 4 is connected to the network connecting section 16. An output section of the movement and model parameter improving section 14 is connected to an input section of the network connecting section 16. Furthermore, an output section of the network connecting section 16 is connected to the input section of the 3D model drawing section 11.

The 3D model drawing section 11 already has a three-dimensional model image (hereinafter referred to as a "3D model") of a general user. It draws and outputs a three-dimensional image according to a given movement and model parameter. This is a function similar to that of conventional graphics processing units (GPU). The movement and model parameter is used to express movement, posture, expression, or the like from an image. By providing the 3D model drawing section 11 with the movement and model parameter, the 3D model can be drawn so as to have an arbitrary movement, posture, or expression to create a three-dimensional drawn image.

The image input section 12 outputs a still image or motion picture input by the camera 2, to the corresponding-point searching section 13.

The corresponding-point searching section 13 searches for that point on the input image input by the image input section 12 which corresponds to a certain point on the three-dimensional drawn image drawn by the 3D model drawing section 11. The search for a corresponding point refers to an operation of searching for a point of the input image which correspond to a certain point on the drawn image.

The movement and model parameter improving section 14 improves the movement and model parameter on the basis of information obtained by searching for the corresponding point. The image output section 15 receives the three-dimensional drawn image drawn by the 3D model drawing section 11 and then outputs the received image to the display.

The network connecting section 16 receives the movement and model parameter from the movement and model parameter improving section 14 and then outputs the received parameter to another image processing device via the network 4. Further, the network connecting section 16 receives information, e.g. the movement and model parameter from the image processing device via the network 4 and then outputs this information to the 3D model drawing section 11.

Now, description will be given of operations of the virtual mirror device 1, shown in FIG. 2.

FIG. 3 is a diagram showing the flow of operations of the virtual mirror device.

First, an initial solution (S1) to the movement and model parameter is externally input to the 3D model drawing section 11. Then, the 3D model drawing section 11 draws a three-dimensional drawn image according to the preset 3D model and the given initial solution to the movement and model parameter (S2).

Further, an input still image or motion picture from the camera 2, e.g. an image of a person's face is loaded into the image input section 12. The drawn image (S3) and the input image (S4) are input to the corresponding-point searching section 13.

The corresponding-point searching section 13 searches for a point on the input image which corresponds to a certain point on the received drawn image (S5). The search for a corresponding point refers to an operation of searching for a point on the input image which corresponds to a certain point on the drawn image. For example, it is checked what position on the input image shown in FIG. 4B corresponds to a point of interest A arranged on an eye portion of the drawn image shown in FIG. 4A. Thus, positional information on a point B corresponding to the point of interest A is obtained. This corresponding-point position information (S6) is input to the movement and model parameter improving section 14.

On the basis of the corresponding-point position information, the movement and model parameter improving section 14 improves the initial solution to the movement and model parameter so that the distance between the corresponding point B and the point of interest A is shorter when the drawn image is drawn again (S7). The movement and model parameter improving section 14 thus calculates a secondary solution (S8). Detailed description will be given of operations of the corresponding-point searching section 13 and the movement and model parameter improving section 14.

The thus obtained secondary solution to the movement and model parameter is fed back to the 3D model drawing section 11. A more accurate movement and model parameter is then determined by drawing a three-dimensional drawn image, searching for a corresponding point, and calculating a movement and model parameter as previously described.

In this manner, an accurate movement and model parameter is calculated by repeating a number of times the process starting with drawing of a three-dimensional drawn image followed by a search for a corresponding point and ending with calculation of a movement and model parameter. The calculated movement and model parameter is input to the 3D model drawing section 11. Then, the 3D model drawing section 11 draws a three-dimensional drawn image and then outputs this image to the image output section 15. Furthermore, the image output section 15 outputs the three-dimensional drawn image to the display 3 for display.

Further, if a motion picture is input to the image input section 12, these input images are loaded into the corresponding-point searching section 13 at predetermined time intervals. First, when the first input image is loaded into the corresponding-point searching section 13, the previously described process is repeated which starts with drawing of a three-dimensional drawn image and ends with calculation of a movement and model parameter. Thus, an accurate movement and model parameter is determined. Then, this movement and model parameter is used to draw a three-dimensional drawn image, which is then output to the image output section 15. Subsequently, when the new input image is loaded into the corresponding-point searching section 13, the process is similarly executed which starts with drawing of a three-dimensional drawn image and ends with calculation of a movement and model parameter. Thus, an accurate movement and model parameter is determined, and a three-dimensional drawn image is output.

In this manner, if a motion picture is input, the input image is loaded every time a predetermined time passes. Then, before the next input image is loaded, the process is repeated which starts with drawing of a three-dimensional drawn image followed by a search for a corresponding point and ends with calculation of a movement and model parameter. Thus, an accurate movement and model parameter is determined. Then, the 3D model drawing section 11 uses this movement and model parameter to draw a three-dimensional drawn image. This image is displayed on the display 3 via the image output section 15.

Further, if an image is input and output using the network 4, the movement and model parameter improving section 14 outputs the finally calculated accurate movement and model parameter to the network 4 via the network connecting section 16. If, on the other hand, a movement and model parameter is received from the network 4 via the network connecting section 16, the 3D model drawing section 11 uses this movement and model parameter to draw a three-dimensional drawn image. This image is then displayed on the display 3 via the image output section 15.

In this example, the movement and model parameter is transmitted and received via the network 4. However, the present invention is not limited to this aspect. Image data may be directly transmitted and received.

Now, detailed description will be given of operations of the corresponding-point searching section 13 and the model parameter improving section 14.

FIGS. 4A and 4B are diagrams showing how the corresponding-point searching section 13 obtains corresponding-point position information. FIG. 4A shows an image drawn by the 3D model drawing section 11. FIG. 4B shows an input image input to the image input section 12.

The corresponding-point searching section 13 executes the process described below to search for a point on an input image which corresponds to a certain point on a drawn image to obtain positional information on the corresponding point. Subsequently, the movement and model parameter improving section 14 uses a least squares method or the like to improve the movement and model parameter so as to minimize the distance between a point on the drawn image and the corresponding point on the input image.

As shown in FIG. 4A, it is assumed that the position of the point of interest A on the drawn image which is defined on a 3D model is defined as $(x_i, y_i)$. However, $i=1, 2, \ldots, N$. N denotes the number of points of interest A. Several tens of to several thousand points of interest are arranged on the drawn image at predetermined intervals.

First, the corresponding-point searching section 13 checks where on the input image an image D is present which is similar to a peripheral image C in which the point of interest A $(x_i, y_i)$ is present. Furthermore, on the basis of the position of the point of interest A in the peripheral image C, the corresponding-point searching section 13 calculates positional information on the corresponding point B $(u_i, v_i)$ in the searched-for corresponding image D as shown in FIG. 4B.

Subsequently, the movement and model parameter improving section 14 improves the movement and model parameter so as to minimize the distance between the point of interest A and the corresponding point B for all points with $i=1, 2, \ldots, N$.

For example, if, the sum of squares of the distance between the point of interest $A(x_i, y_i)$ and the corresponding point $B(u_i, v_i)$ is defined as R, the following equation is given:

$$R = \Sigma (x_i, y_i) - (u_i, v_i)|^2$$

In this case, $x_i$ and $y_i$ are functions of a movement and model parameter P. Accordingly, R is also a function of P, i.e. the expression R(P) is possible. Consequently, the movement and model parameter, which represents a movement, posture, or expression, can be improved by determining P so as to minimize R.

Alternatively, a function other than the sum of squares such as the one shown below may be used as the function R(P).

$$R = \Sigma \lambda_i |(x_i, y_i) - (u_i, v_i)|^2$$

($\lambda_i$ denotes a constant specified for each point)

Now, an example will be shown in which the virtual mirror device 1 is formed in a single semiconductor device.

FIG. 5 is a layout showing an example in which a part of the virtual mirror device is arranged on a single semiconductor substrate.

As shown in FIG. 5, the following components are arranged on a semiconductor substrate 21: an I/O image processing unit 23, a matrix calculating unit 24, a bus interface 25, an input circuit 26, and an output circuit 27 all connected to a data transfer path 22.

The I/O image processing unit 23 executes the same process that is executed by the 3D model drawing section 11 and the corresponding-point searching section 13. The matrix calculating unit 24 executes the same process that is executed by the movement and model parameter improving section 14. In this regard, the I/O image processing unit 23 may execute the same process that is executed by the movement and model parameter improving section 14. Further, if the movement and model parameter improving section 14 must process a large amount of data, the data may be processed, via a bus interface 25, by a processing device provided outside the semiconductor substrate 21.

An image input by an externally provided camera is input to the input circuit 26. A three-dimensional drawn image processed by the I/O image processing unit 23 is input to the output circuit 27. The drawn image is output to an externally provided display.

By thus integrating the arrangements of the previously described virtual mirror device on the single semiconductor substrate, the movement and model parameter, which precisely indicates a movement or an expression from an input image, can be calculated at high speed. As a result, it is possible to display a three-dimensional drawn image on the display 3 at high speed in real time.

In the first embodiment, a person's posture or expression can be calculated efficiently and accurately by matching a drawn image created by using a 3D model, with an input image.

Further, by integrating the 3D model drawing section, the corresponding-point searching section, and the movement and model parameter improving section on the single semiconductor substrate, processes can be executed at high speed in real time without the need to transfer data outside the semiconductor device.

Furthermore, since the device is connected to a network, a user's posture or expression can be efficiently transmitted to a remote location. Moreover, it is possible to communicate with a remote user as in the case of a videophone. It is also possible to make communication in a virtual space using gestures or expressions. Further, the use of avatars enables anonymity to be maintained.

Second Embodiment

Now, description will be given of a virtual mirror device according to a second embodiment. The second embodiment corresponds to the configuration of the first embodiment, which has already been described and shown in FIG. 2 and to which a 3D model creating section is added. The other arrangements of the second embodiment are similar to those of the first embodiment.

Figure 6:
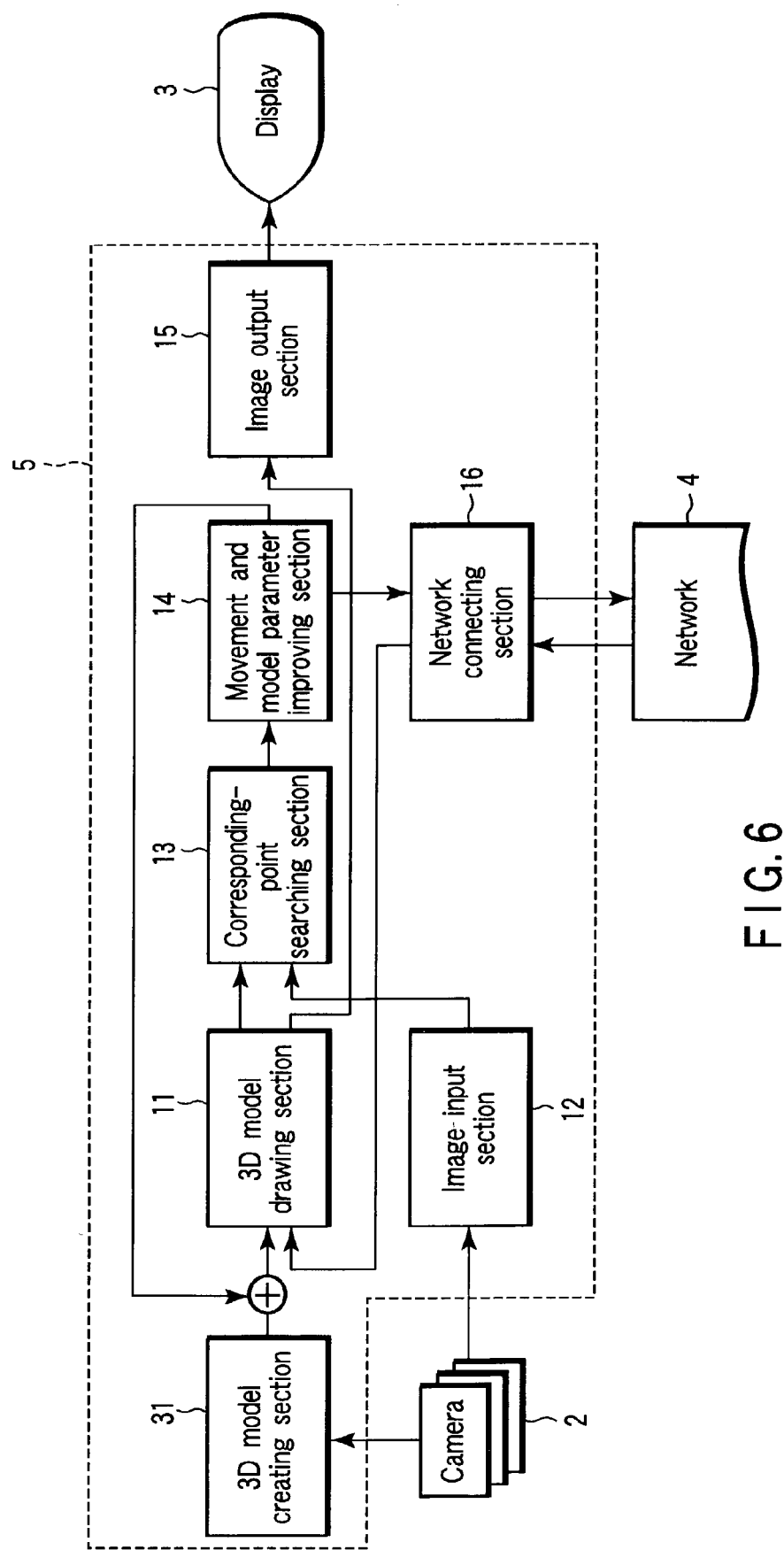
FIG. 6 is a block diagram showing a configuration of a virtual mirror device according to a second embodiment of the present invention.
Figure 7:
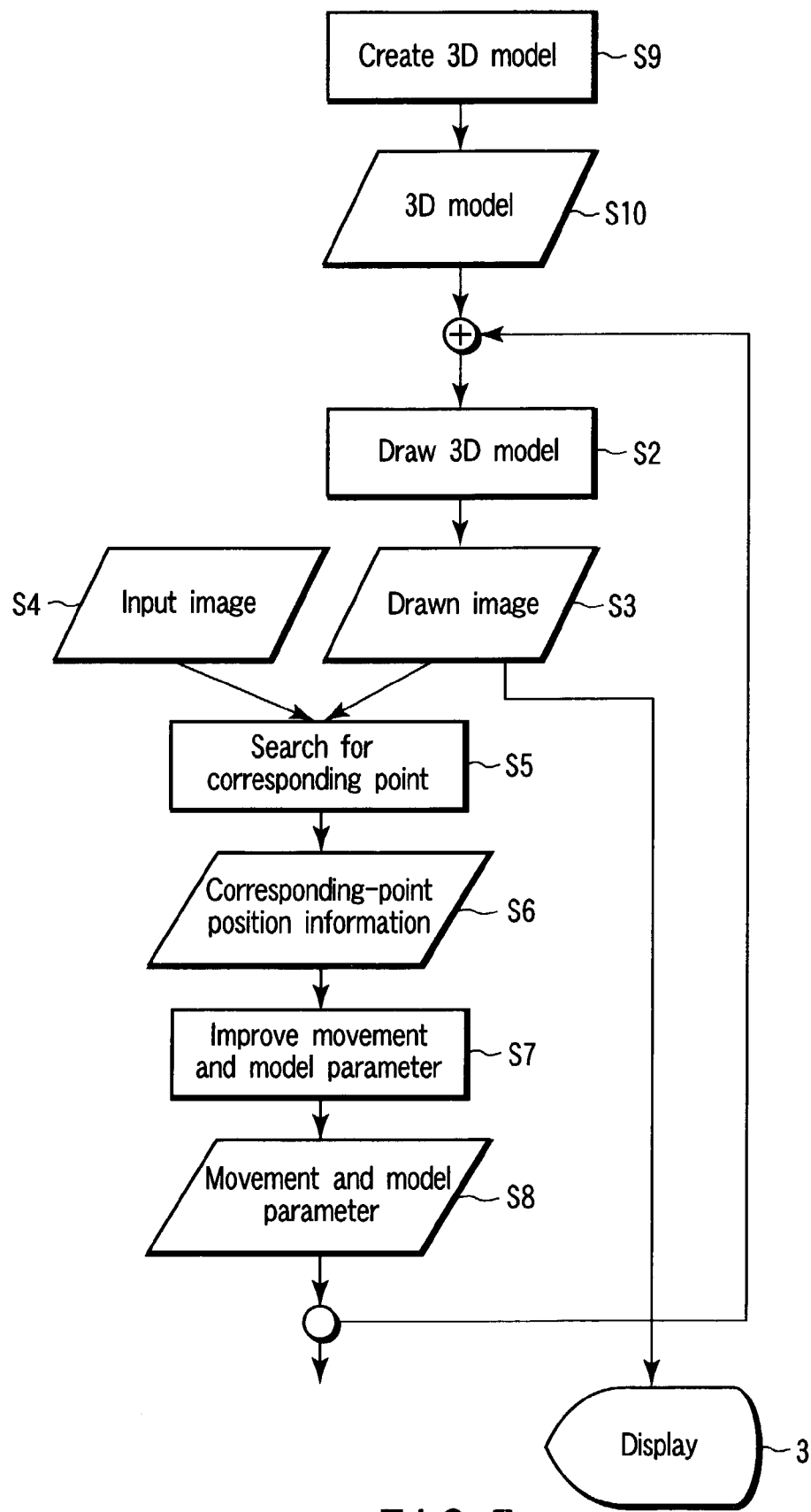
FIG. 7 is a diagram showing the flow of operations performed by the virtual mirror device according to the second embodiment.

FIG. 6 is a block diagram showing a configuration of the virtual mirror device according to the second embodiment. FIG. 7 is a diagram showing the flow of operations performed by this virtual mirror device.

A virtual mirror device 5 is composed of a 3D model creating section 31, a 3D model drawing section 11, an image input section 12, a corresponding-point searching section 13, a movement and model parameter improving section 14, an image output section 15, and a network connecting section 16 as shown in FIG. 6.

A plurality of input images from the respective cameras 2 are input to the 3D model creating section 31. On the basis of the plurality of input images, the 3D model creating section 31 creates a three-dimensional model image (3D model) and a movement and model parameter (S9). The 3D model (S10) and the movement and model parameter are input to the 3D model drawing section 11. The 3D model drawing section 11 thus draws a three-dimensional drawing image.

Further, the plurality of input images from the respective cameras 2 are input to the image input section 12. Furthermore, the drawn image and the input images are input to the corresponding-point searching section 13.

The corresponding-point searching section 13 searches for a point on the received input images which corresponds to a certain point on the received drawn image. The processing executed after the search for a corresponding point is similar to that in the first embodiment. Thus, its description is omitted.

The thus configured virtual mirror device 5 comprises the 3D model creating section 31 that uses input images input by the cameras 2 to create a 3D model and a movement and model parameter. Thus, a three-dimensional drawn image can be created by the 3D model creating section 31 without previously providing the 3D model drawing section 11 with a 3D model and a movement and a model parameter. In other words, the 3D model creating section 31 and the 3D model drawing section 11 can be used to create a three-dimensional drawn image without setting up a 3D model used by the 3D model drawing section 11 or inputting a movement and model parameter to the 3D model drawing section 11. This enables the virtual mirror device 5 to operate.

In the second embodiment, a person's posture or expression can be calculated efficiently and accurately by matching a drawn image created using a 3D model with an input image.

Further, by integrating the 3D model creating section, the 3D model drawing section, the corresponding-point searching section, and the movement and model parameter improving section on the single semiconductor substrate, processes can be executed at high speed in real time without the need to transfer data outside the semiconductor device.

Furthermore, since the device is connected to a network, a user's posture or expression can be efficiently transmitted to a remote location. Moreover, it is possible to communicate with a remote user as in the case of a videophone. It is also possible to make communication in a virtual space using gestures or expressions. Further, the use of avatars enables anonymity to be maintained.

Moreover, the 3D model creating section enables an arbitrary user to use this virtual mirror device.

As described above, according to the present embodiment, for example, during a process of receiving an input image of a person and analyzing, decorating, and displaying this input image, changes of expression of this person's face or its movements can be precisely extracted by using an algorithm that carries out the previously described matching of a three-dimensional model image with an input image. The algorithm can be executed more efficiently by integrating a device executing the algorithm, on a semiconductor substrate.

Further, by integrating some functions on the semiconductor device, a real-time process can be executed, which is difficult to achieve with a general-purpose processor. Thus, an output image subjected to image processing can be interactively used like a mirror. Furthermore, such an image can be used for applications requiring a real-time process. For example, in the case of videophone, a user can decorate or restrict an image displayed on a display of a person with which the user is communicating.

As described above, according to the present embodiment, it is possible for example to provide an image processing device which can efficiently and precisely execute image processing such as decoration or manipulation of an input image and which can process an input image in real time.

Further, the previously described embodiments can be individually achieved or can be properly combined. Furthermore, each of the previously described embodiments includes various levels of inventions. Thus, various levels of inventions can be extracted by properly combining the plurality of constituent requirements disclosed in the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   an image drawing section which has a preset three-dimensional model image to draw a three-dimensional image on the basis of the three-dimensional model image and a first movement and model parameter; an image input section to which an input image of a still image or a motion picture is input;
   a corresponding-point searching section which searches for that point on the input image input to the image input section which corresponds to a certain point on the three-dimensional image drawn by the image drawing section, to obtain corresponding-point position information; and
   a movement and model parameter improving section which determines a second movement and model parameter by improving a value of the first movement and model parameter, to minimize a sum of distance functions determined by each of the corresponding-point position information obtained by the corresponding-point searching section.

2. An image processing device according to claim 1, wherein the corresponding-point searching section obtains the corresponding-point position information by arranging a plurality of points on the three-dimensional image and searching for a point on the input image which corresponds to each of the plurality of points.

3. An image processing device according to claim 2, wherein when the image drawing section has drawn a three-dimensional image on the basis of the three-dimensional model image and the second movement and model parameter, the movement and model parameter improving section determines the second movement and model parameter so as to minimize the distance between two corresponding points for the plurality of points arranged on the three-dimensional image and the corresponding plurality of points on the input image.

4. An image processing device according to claim 1, wherein the second movement and model parameter determined by the movement and model parameter improving section is input to the image drawing section,
   the image drawing section draws a three-dimensional image on the basis of the three-dimensional model image and the second movement and model parameter,
   the corresponding-point searching section obtains corresponding-point position information on the three-dimensional image and the input image, and
   the movement and model parameter improving section uses the corresponding-point position information to improve a value for the second movement and model parameter to determine a third movement and model parameter.

5. An image processing device according to claim 4, further comprising an image output section which externally outputs the three-dimensional image drawn by the image drawing section on the basis of the three-dimensional model image and the third movement and model parameter.

6. An image processing device according to claim 5, wherein if the input image input to the image input section is an image of a person, the image output section outputs an avatar image for movement, posture, or expression approximating to that in the image of the person.

7. An image processing device according to claim 1, wherein the image drawing section and the corresponding-point searching section are formed on a single semiconductor substrate.

8. An image processing device according to claim 7, wherein the movement and model parameter improving section is further formed on the semiconductor substrate.

9. An image processing device according to claim 1, further comprising a network connecting section which outputs the second movement and model parameter determined by the movement and model parameter improving section, to a network.

10. An image processing device according to claim 9, wherein the network connecting section receives the first movement and model parameter from the network and outputs the first movement and model parameter to the image drawing section.

11. An image processing device comprising:
    a model image creating section which uses an input image of a still image or a motion picture to create a three-dimensional model image and a first movement and model parameter;
    an image drawing section which draws a three-dimensional image on the basis of the three-dimensional model image and first movement and model parameter created by the model image creating section;
    an image input section to which the input image of the still image or the motion picture is input;
    a corresponding-point searching section which searches for that point on the input image input to the image input section which corresponds to a certain point on the three-dimensional image drawn by the image drawing section, to obtain corresponding-point position information; and
    a movement and model parameter improving section which determines a second movement and model parameter by improving a value of the first movement and model parameter, to minimize a sum of distance functions determined by each of the corresponding-point position information obtained by the corresponding-point searching section.

12. An image processing device according to claim 11, wherein the corresponding-point searching section obtains the corresponding-point position information by arranging a plurality of points on the three-dimensional image and searching for a point on the input image which corresponds to each of the plurality of points.

13. An image processing device according to claim 12, wherein when the image drawing section has drawn the three-dimensional image on the basis of the three-dimensional model image and the second movement and model parameter, the movement and model parameter improving section determines the second movement and model parameter so as to minimize the distance between two corresponding points for the plurality of points arranged on the three-dimensional image and the corresponding plurality of points on the input image.

14. An image processing device according to claim 11, wherein the second movement and model parameter determined by the movement and model parameter improving section is input to the image drawing section, the image drawing section draws a three-dimensional image on the basis of the three-dimensional model image and the second movement and model parameter, the corresponding-point searching section obtains corresponding-point position information on the three-dimensional image and the input image, and the movement and model parameter improving section uses the corresponding-point position information to improve a value for the second movement and model parameter to determine a third movement and model parameter.

15. An image processing device according to claim 14, further comprising an image output section which externally outputs the three-dimensional image drawn by the image drawing section on the basis of the three-dimensional model image and the third movement and model parameter.

16. An image processing device according to claim 15, wherein if the input image input to the image input section is an image of a person, the image output section outputs an avatar image for movement, posture, or expression approximating to that in the image of the person.

17. An image processing device according to claim 11, wherein the image drawing section and the corresponding-point searching section are formed on a single semiconductor substrate.

18. An image processing device according to claim 17, wherein the movement and model parameter improving section is further formed on the semiconductor substrate.

19. An image processing device according to claim 11, further comprising a network connecting section which outputs the second movement and model parameter determined by the movement and model parameter improving section, to a network.

20. An image processing device according to claim 19, wherein the network connecting section receives the first movement and model parameter from the network and outputs the first movement and model parameter to the image drawing section.

21. An image processing method comprising:

drawing a three-dimensional image on the basis of a three-dimensional model image and a first movement and model parameter;

receiving an input image of a still image or a motion picture;

searching for a point on the input image which corresponds to a certain point on the three-dimensional image to obtain corresponding-point position information; and determining a second movement and model parameter by improving a value of the first movement and model parameter, to minimize a sum of distance functions determined by each of the corresponding-point position information obtained by the corresponding-point searching section.

22. An image processing method according to claim 21, wherein the corresponding-point position information is obtained by arranging a plurality of points on the three-dimensional image and searching for a point on the input image which corresponds to each of the plurality of points.

23. An image processing method according to claim 22, wherein the second movement and model parameter is calculated so as to minimize the distance between two corresponding points for the plurality of points arranged on the three-dimensional image and the corresponding plurality of points on the input image, when the three-dimensional image is drawn on the basis of the three-dimensional model image and the second movement and model parameter.

24. An image processing method according to claim 21, wherein a three-dimensional image is drawn on the basis of the three-dimensional model image and the second movement and model parameter, corresponding-point position information is obtained on the three-dimensional image and the input image, and the corresponding-point position information is used to improve a value for the second movement and model parameter to determine a third movement and model parameter.

25. An image processing method according to claim 24, wherein the three-dimensional image drawn on the basis of the three-dimensional model image and the third movement and model parameter is externally output.

26. An image processing method according to claim 21, wherein the second movement and model parameter is output to a network.

27. An image processing method according to claim 21, wherein the first movement and model parameter is input from a network.

28. An image processing method according to claim 21, wherein if the input image is an image of a person, an avatar image for movement, posture, or expression approximating to that in the image of the person is output.

29. An image processing method comprising:

using an input image of a still image or a motion picture to create a three-dimensional model image and a first movement and model parameter;

drawing a three-dimensional image on the basis of the three-dimensional model image and the first movement and model parameter;

receiving the input image of the still image or the motion picture;

searching for a point on the input image which corresponds to a certain point on the three-dimensional image to obtain corresponding-point position information; and determining a second movement and model parameter by improving a value of the first movement and model parameter, to minimize a sum of distance functions determined by each of the corresponding-point position information obtained by the corresponding-point searching section.

30. An image processing method according to claim 29, wherein the corresponding-point position information is obtained by arranging a plurality of points on the three-dimensional image and searching for a point on the input image which corresponds to each of the plurality of points.

31. An image processing method according to claim 30, wherein the second movement and model parameter is calculated so as to minimize the distance between two corresponding points for the plurality of points arranged on the three-dimensional image and the corresponding plurality of points on the input image, when the three-dimensional image is drawn on the basis of the three-dimensional model image and the second movement and model parameter.

32. An image processing method according to claim 29, wherein a three-dimensional image is drawn on the basis of the three-dimensional model image and the second movement and model parameter, corresponding-point position information is obtained on the three-dimensional image and the input image, and the corresponding-point position information is used to improve a value for the second movement and model parameter to determine a third movement and model parameter.

33. An image processing method according to claim 32, wherein the three-dimensional image drawn on the basis of the three-dimensional model image and the third movement and model parameter is externally output.

34. An image processing method according to claim 29, wherein the second movement and model parameter is output to a network.

35. An image processing method according to claim 29, wherein the first movement and model parameter is input from a network.

36. An image processing method according to claim 29, wherein if the input image is an image of a person, an avatar image for movement, posture, or expression approximating to that in the image of the person is output.

* * * * *